Figure 1:
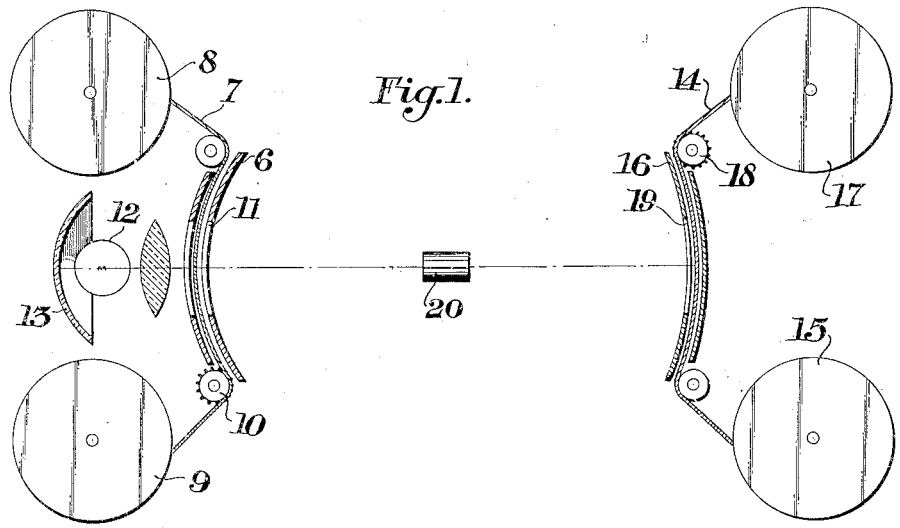

June 6, 1933.                M. W. SEYMOUR                1,912,661
METHOD OF COPYING COLOR RECORDS
Filed Aug. 23, 1930          2 Sheets-Sheet 1

Inventor,
Merrill W. Seymour,
By Newton M. Perriss
Attorney.

June 6, 1933.  M. W. SEYMOUR  1,912,661
METHOD OF COPYING COLOR RECORDS
Filed Aug. 23, 1930   2 Sheets-Sheet 2
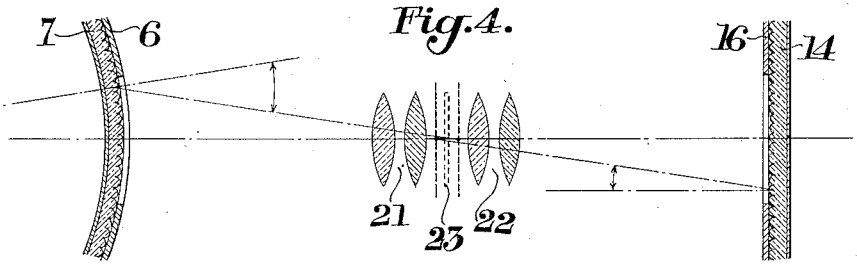
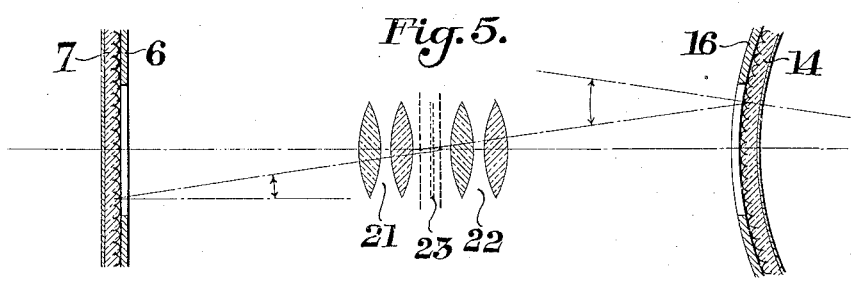
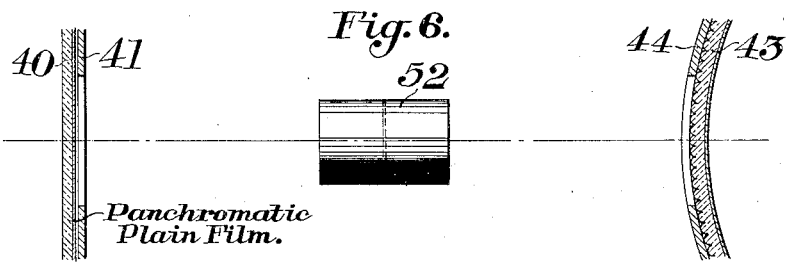
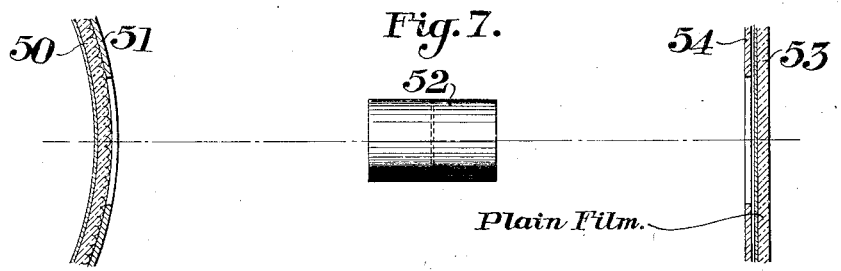
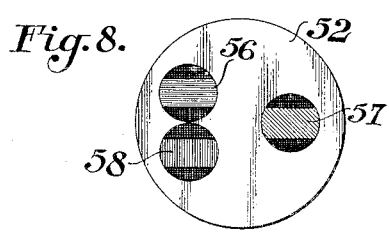
Inventor,
Merrill W. Seymour,
By Newton M. Perris
Attorney.

Patented June 6, 1933

1,912,661

UNITED STATES PATENT OFFICE

MERRILL W. SEYMOUR, OF ROCHESTER, NEW YORK, ASSIGNOR TO EASTMAN KODAK COMPANY, OF ROCHESTER, NEW YORK, A CORPORATION OF NEW YORK

METHOD OF COPYING COLOR RECORDS

Application filed August 23, 1930. Serial No. 477,231.

This invention relates to color-photography and more particularly to an improvement in the method of and apparatus for printing from one support or film to another, applicable to a process of the type disclosed in the patent to Berthon, #992,151, granted May 16, 1911, involving the use of a film or support having microscopic lens elements embossed on one surface thereof and a sensitized emulsion applied on the other surface.

One of the problems in this process is the making of prints from an original lenticular film to a second lenticular film wherein the printed film when projected will retain the picture definition and the true color values of the original. In the present process both the original film and the film to be printed are positioned at conjugate foci of a lens system of an optical printer with the lenticular surface of each of said films or supports facing the lens system. The printer is so arranged and the original and the printing stock are so positioned therein that an aerial image of the original taking filters is then formed somewhere in the optical system by the original film and is focused on the emulsion of the printing stock by the lens elements embossed thereon. In such a printer, it is essential that the apparent distance of this aerial image from both the original film and the printing stock should be easily and accurately controlled, for which purpose it has been proposed to employ positive or negative compensating lenses placed between the printer lens and either or both films. Such compensating lenses in addition to the disadvantage of introducing aberration effects, also are difficult to keep clean in operation.

In accordance with the present invention it is, therefore, proposed to accomplish the equivalent of varying the distance of the aerial image from the printing stock, not by the use of compensating lenses, but rather by adjusting the curvature of one or both film tracks or gates utilized to guide the original film and the printing stock past the windows of the printer, the axis of curvature of the track or tracks being parallel to the axes of the lens elements of the two films. These tracks or gates through which the films pass may be curved either to the same or a different degree of curvature. However, the curvature of the film must be such that the aerial image of the filters formed in the printer appears in the same direction as the filters in the camera from the point of view of each minute lens element on the film.

In my Patent #1,708,370, granted April 9, 1929, there are diagrammatically disclosed cameras and projectors having curved gates wherein the relation between the curvature of the gate of the taking camera and the projector in which the film taken thereby is to be projected, is defined by the fact that the angle between lines from corresponding points in the gate to the apparent position of the filter image and to the center of curvature of the gate, is the same in the camera and projector.

It is frequently desirable in printing a film taken in a camera having a lens of one focal length and a gate of one curvature to utilize a printer in which the corresponding lens unit may have a different focal length. In such a case the curvature of the gate for the original film in the printer should bear such a relation to the gate in the taking camera and to the apparent position of the camera filters that there are equal angles in both systems between lines drawn from a corresponding point in the gate to the virtual image and to the center of curvature of the gate. It also frequently happens that it is desirable to use a lens unit in a printer for recording the projected image of the original film on the printing stock, which may vary in focal length from that of the objective of the projector used to project the film just printed. The focal length of the projector, as is well-known, is determined by the desired size of the projected picture and the distance of the projector from the screen. The curvature of the gate over which the film passes while being printed, also bears a definite relationship to the curvature of the gate of the projector in which the film is to be projected and to the apparent position of the projection filters. This relation is determined by the fact that there are equal angles in both systems between lines drawn from a corresponding point in the gate to the virtual image and to the center of curvature of the gate. In this way the objective of the projector may have one focal length and the corresponding lens unit in the optical printer may have a different focal length without disturbing the picture definition and color values. By thus varying the curvature of the film tracks, and focal length of the printer lens is independent of the focal lengths of the lens units of the camera and the projector.

The present invention is also applicable to the method of printing disclosed in my copending application, Serial Number 472,349, filed August 1, 1930 wherein a color separation picture on panchromatic film may be printed on embossed film when supported on a curved gate as herein disclosed, and is also applicable to the method shown in the mentioned application for printing from a lenticular film supported on a curved gate, on an unembossed film.

Figure 2:
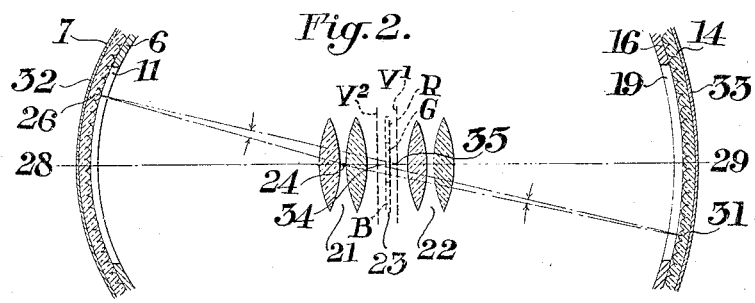
Figure 3:
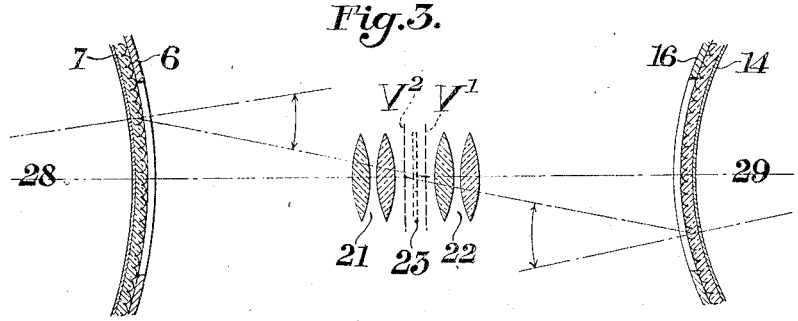

For a clearer understanding of the invention, reference is made to the drawings in which Fig. 1 is a diagram of an optical printer embodying my invention; Fig. 2 is a detail view of the optical system and gates of the printer of Fig. 1 with the lens elements on the films represented as greatly enlarged; Figs. 3, 4 and 5 are diagrams showing how the gates for supporting the original film and the printing stock may be variously curved, according to the present invention to accomplish different results; Figs. 6 and 7 show a modified form of the invention in which Fig. 6 indicates diagrammatically an arrangement for printing a three-color separation picture taken on unembossed panchromatic film to form a composite picture on lenticular printing stock supported on a curved gate; and Fig. 7 diagrammatically indicates how a picture taken on lenticular film and supported on a curved gate may be printed as a three-color separation picture on unembossed film; and Fig. 8 is a view of a lens unit suitable for use in the arrangements of Figs. 6 and 7.

Referring especially to Fig. 1, there is represented an optical printer having a curved gate 6 through which the original lenticular film 7 bearing a photographic record representing pictures of different color values, is moved from a supply reel 8 to a take-up reel 9, by means of conventional pull-down mechanism indicated at 10. Behind the window 11 of the gate there is positioned a light source 12 and a suitable reflector 13 serving to illuminate uniformly the portion of the film 7 in the window of the gate. Similarly the lenticular printing stock 14 is moved from a supply reel 15 through the gate 16 to the take-up reel 17 by means of conventional pull-down mechanism 18. The pull-down mechanisms 10 and 18 are so interconnected that the films 7 and 14 are moved synchronously preferably a frame at a time. The gate 16 likewise has a window 19 positioned opposite to the window 11 in gate 6. Intermediate of these windows, there is placed an optical system 20 which serves to reimage on the photographic surface of the film 14, the photographic images which were recorded on the film 7 when this film was originally exposed in the taking camera.

As will be more clearly understood from Fig. 2, the gates 6 and 16 are bowed about an axis parallel to the long axes of the lens elements of the films which are herein assumed to extend transversely of the films. The lens system 20, as shown in this figure, includes two lens units 21 and 22, in which the lens unit 21 forms an image of the picture on the original film substantially at infinity, while the lens elements of the film 7 bring the microscopic images of the camera filters on the emulsion surface 32 to a focus in a composite aerial image 23. It is assumed that the filter comprises bands or color strips respectively colored red, green and blue, which bands are indicated in the aerial image 23 by the corresponding letters "R", "G", and "B". The lens system 20 also includes a lens unit 22 which serves to focus the essentially parallel rays from the various points in the original film so as to form an image of the original in the window 19 in the plane of the film 14, while the lenticular elements on the film 14 serve to reimage the aerial image 23 on the emulsion surface 33 of the film 14. In order to achieve the condition described above with respect to the apparent direction of the filter images from the lens elements without having the lens unit 21 equal in focal length to the focal length of the taking camera, the gate 6 will have a different curvature from that of the gate of the taking camera, the curvature of this gate being so selected that the angle defined by a line drawn from the center of curvature 24 of the gate 6 to the optical center 26 of any minute lens, and another line drawn from this optical center to a point 35 in the virtual image V' on the optical axis 28, 29 is equal to a like angle similarly defined in the taking camera, such as is disclosed diagrammatically in my previously-mentioned patent. The curvature of the gate 16, however, is so selected that an angle defined by a line drawn through its center of curvature 24 and through the optical center 31 of any lens element of the film 14 and another line drawn through this optical center to a point 34 located at the intersection of the optical axes 28, 29 and the virtual image $V^2$, which angle is equal to a corresponding angle similarly defined in the projector in which the film 14 is to be projected.

In the form of the invention shown in Figs. 1 and 2, the gates 6 and 16 are shown as concave with respect to the optical system, while in the arrangement of Fig. 3, these gates are shown as curved convexly with respect to the optical system. However, in Fig. 4 the gate 6 for supporting the original film is curved convexly with respect to the optical system, while the gate 16 for the printing stock 14 is shown as a plane surface. This flat gate may be regarded as a curved surface having its center of curvature at infinity. In the form of the invention shown in Fig. 5, the gate 6 for the original film is shown as a plane surface, that is, a curved surface with its center of curvature at infinity, while the gate 16 for the printing stock 14 is represented as being convex with respect to the optical system. In each of these forms of the invention the gate 6 should have such a curvature that the angle of the printer, previously referred to, should be equal to a corresponding angle similarly defined in the camera in which the film 7 was originally taken, while the gate 16 should have such curvature and the lens unit 22 should have such a position and focal length, that the angle, as previously defined, is equal to a corresponding angle similarly defined with respect to the projector in which the film 14 is to be projected.

While either the camera lens or the projector lens may have the greater focal length, it is customary for the projector lens to have the greater focus, and this has been assumed. As a result, the image of the camera filters will usually appear, from the point of view of the film, to be at a shorter distance than the image of the projection filters. It is also desirable for the sake of covering power, for the lens unit 21 to have a greater focal length than the usual camera lens. The aerial image of the filters in the printer will, therefore, be at a greater distance from the original film than in the camera.

According to still another form of the invention a three-color separation picture taken on unembossed panchromatic film 40, which is supported in a flat gate 41, is printed on lenticular film 43 in the form of a composite picture by means of lens unit 52 (Fig. 8), as is more fully disclosed in my mentioned copending application. The film 43 is supported on a curved gate 44, the curvature of which is determined as previously set forth by a predetermined relationship to the curvature of the gate of the projector in which the film 43 is to be projected. The optical system includes a lens unit 52, having lenses 56, 57 and 58 displaced perpendicularly to the axes of the lens elements on the films, and having their apertures suitably restricted by diaphragms.

In the form of the invention shown in Fig. 7 a picture taken on lenticular film 50 and supported by the curved gate 51 is printed by means of the optical system 52 as a three-color separation piture on unembossed film 53 supported on a flat gate 54. The lens system 52, as is more fully disclosed in my copending application, includes a lens unit 55 having the lenses 56, 57 and 58 properly positioned therein. The curvature of the gate 51 is determined, as previously described, by a predetermined relationship to the curvature of the gate of the camera in which the film 50 was originally taken.

From the foregoing, it will be seen that the radius of curvature of the gates 6 and 16 may vary from a small finite positive or negative value to an infinite value in which the gates assume a flat surface, the gate for the original may be straight, convex or concave and the gate for the printing stock may be straight, convex, or concave, according to the following table of possible combinations.

| Gate for the original | Gate for printing stock |
|---|---|
| Straight | Concave. Convex. Straight. |
| Convex | Convex. Concave. Straight |
| Concave | Convex. Concave. |

In each of these cases the axis of curvature is parallel to the color bands of the original taking filter and the axes of the minute lens elements on the films may be cylindrical and parallel to the bands of the taking color filters. The invention, however, is not limited to cylindrical lens elements on the film, but film embossed with spherical lens elements may be used providing the gate is curved about an axis parallel to the length of the color bands of the filters. While the lens system has been shown substantially equi-distant from the two gates of the printer, the position of the lens system therein is determined by the size of the desired print, that is, whether it shall be the same size as the original, or shall appear as a reduction or an enlargement.

It will be appreciated that each gate may have any one of a large number of possible degrees of curvature of which only a few examples have been disclosed herein. In Fig. 2, it so happens that the centers of curvature of the gates 6 and 16 coincide but this is not essential, for they may have different centers of curvature in accordance with the necessary operating requirements.

What I claim is:

1. The method of printing in an optical printer from a lenticular original member taken through color filters, to a second lenticular member for projection in a projector which may have an objective of the same or of a different focal length from that of the objective of the taking camera, which method comprises forming an aerial image of the microscopic color records of said original in the optical system of the printer in such a manner that the lens elements on the second member reimage the color records so that said second member may be projected with a projecting lens of any predetermined focal length, while controlling the effective relationship between said aerial image and said members by supporting each of said members in a curved path during the printing operation, the curvature of said paths bearing a predetermined relationship to the curvature of the path of the original member while being taken and the curvature of the printer member while being projected.

2. The method of printing in an optical printer from a lenticular original member taken in a camera provided with color filters to a second lenticular member for projection in a projector which may have an objective of the same or a different focal length from that of the objective of the taking camera, which method comprises forming an aerial image of the microscopic color records of said original in the optical system of the printer in such a manner that the lens elements on the second member image the color records so that said second member may be projected with a projecting lens of any predetermined focal length, while controlling the effective relationship between said aerial image and said members by supporting each of said members in a curved path during the printing operation, the curvature of the path of the original member while being taken and the curvature of the printed member while being projected bearing a predetermined relationship, the curvature of the path of said original being defined by the fact that in the taking camera and in the portion of the printer for forming the aerial image, the angles between lines from corresponding points in the path of travel to the apparent position of the aerial image formed from said original and to the center of curvature of said path, are equal.

3. The method of printing in an optical printer from a lenticular, original member taken in a camera provided with color filters to a second lenticular member for projection in a projector which may have an objective of the same or a different focal length from that of the objective of the taking camera, which method comprises forming an aerial image of the microscopic color records of said original in the optical system of the printer in such a manner that the lens elements on the second member image the color records so that said second member may be projected with a projecting lens of any predetermined focal length, while controlling the effective relationship between said aerial image and said members by supporting each of said members in a curved path during the printing operation, the curvature of the path of the original member while being taken and the curvature of the printed member while being projected, bearing a predetermined relationship, the curvature of the path of said original being defined by the fact that in the taking camera and in the portion of the printer for forming the aerial image the angles between lines from corresponding points in the path of travel to the apparent position of the aerial image formed from said original and to the center of curvature of said path, are equal, and the curvature of the path of the member to be printed being defined by the fact that in the projector in which the printed film is to be projected and in the portion of the printer for forming the aerial image on the member to be printed, the angles between lines from corresponding points in the path of travel and to the apparent position of the aerial image and to the center of curvature of said path are equal.

4. An optical printer for printing from an original taken in a camera provided with color filters, to a record for projection in a projecting apparatus provided with color filters, said original and said record each comprising a member having a photographic layer on one surface and image-forming elements on the other surface thereof, said printer including a curved gate for said original, a lens system cooperating therewith, whereby the individual image-forming elements project minute images of the polychromatic filter to form a composite aerial image thereof, a gate for said record cooperating with said lens system and having such a curvature that minute images of said aerial image are formed by the individual elements of said record in such relation substantially to the optical axes of said elements that the resulting print, when completed, will be capable of projecting all of these images through the corresponding areas of the color filter in the projection apparatus.

5. An optical printer for printing a record from an original taken through a polychromatic screen in a camera having a gate for supporting said original, said original and said record each comprising a member having a photographic layer on one surface and image-forming elements on the other surface thereof, said printer including a curved gate for said original, a lens system cooperating therewith whereby the individual image-forming elements project minute images of the polychromatic screen to form a composite aerial image thereof, a gate for said record cooperating with said lens system and having such a curvature that minute images of said aerial image are projected by the individual elements of said record on the photographic layer thereof, the curvature of the gate for said original being determined by the fact that in the camera in which the original is taken and in the portion of the printer in which the aerial image is formed, the angles between lines from a corresponding point in the gate to the apparent position of the aerial image and to the center of curvature of the gate, are equal.

6. An optical printer for use in a color process in which the original and the record to be printed each includes a member provided with an image layer having associated therewith numerous microscopic image-forming elements, an exposure gate for supporting the original, a lens unit, and a gate for supporting the record to be printed, said first gate being curved and having a radius of curvature at least as great as its distance from the apparent position of said aerial image and the second gate having a radius of curvature greater than that of the first-mentioned gate.

7. An optical printer for use in a color process in which the original and the record to be printed each utilize a member provided with an image layer having associated therewith numerous microscopic image-forming elements, a curved gate for supporting the original, a lens system for imaging the original on said record, and a second curved gate for supporting the record to be printed, said first gate being curved and having a radius of curvature greater than said second gate.

8. An optical printer for use in a color process in which the original and the record to be printed each includes an image layer having associated therewith numerous microscopic, lineal, parallel image-forming elements, a gate for supporting the original, a lens system, and a curved gate for supporting the record to be printed, said first gate being curved about an axis parallel to said image-forming elements and having a radius of curvature less than the radius of curvature of said second gate.

9. An optical printed for printing from an original taken in a camera provided with color filters, to a record for projection in a projecting apparatus provided with color filters, said original and said record each including a member provided with an image layer having associated therewith numerous microscopic image-forming elements, said printer comprising two dissimilar, complementary, optical systems by which said original is imaged on said record, and a gate in each system for suporting its respective image layer, each gate being curved with respect to its corresponding optical system about an axis parallel to the axes of the lens elements on the member which it supports, the curvature of the two gates having a predetermined relation defined by the fact that minute images of the original taking color filters are formed by the individual microscopic elements of said record in such relation to the optical axes of said elements that the resulting print, when completed, will be capable of projecting all of these images through the corresponding areas of the color filter in the projecting apparatus.

10. An optical printer for reproducing, on a sensitized lenticulated film intended for use in a projector having a known optical system and a color filter, images from a lenticulated film which has been exposed in a camera having a known optical system and a color filter, the printer comprising a gate for supporting the exposed film, a second gate for supporting the sensitized film, and an optical system for projecting an image of the film at the first gate to the film at the second gate, at least one of the gates being curved, and the constants of the optical system and of the curvatures of the gates being such that there is produced by a portion of the optical system an aerial image and a virtual image of the images on the film, the virtual image being similar in position and size to the virtual image of the color filter used in making said images, and there is produced on the sensitized film an image of said aerial image corresponding to a virtual image similar in position and size to the position of the virtual image of the color filter of the projector with which the sensitive film is to be used.

Signed at Rochester, New York, this 14th day of August 1930.

MERRILL W. SEYMOUR.